Patented Feb. 28, 1933

1,899,186

UNITED STATES PATENT OFFICE

LEON W. EBERLIN, OF ROCHESTER, NEW YORK, AND LORING W. BLANCHARD, JR., OF STONEHAM, MASSACHUSETTS, ASSIGNORS TO EASTMAN KODAK COMPANY, OF ROCHESTER, NEW YORK, A CORPORATION OF NEW YORK

CELLULOSE ACETATE LACQUER CONTAINING CHLORINATED ROSIN

No Drawing.   Application filed January 25, 1932. Serial No. 588,810.

This invention relates to cellulose acetate lacquers. Its object is to provide cellulose acetate lacquers containing an inexpensive, compatible rosin.

Rosins are used in cellulose lacquers to increase gloss and improve adhesion. The development of cellulose acetate lacquers has been hampered by the fact that, as compared with the large number of rosins which have been used with nitrocellulose, only a small number of rosins have been found which are compatible with cellulose acetate. Those which have been found to be compatible are relatively expensive.

We have discovered that chlorinated rosin is compatible with cellulose acetate, and that clear lacquers comprising cellulose acetate and chlorinated rosin can be prepared, which give clear, transparent films. If pigmented or colored lacquers are desired, pigments or dyes may be added to the clear lacquers.

Chlorinated rosin may be prepared in known manner by dissolving rosin in carbon tetrachloride and passing chlorine gas through the solution, if necessary with the application of heat. Varying percentages of chlorine may be introduced into the rosin.

Our invention may be carried out in the following manner. Twenty pounds of cellulose acetate, 10 pounds of chlorinated rosin, and four pounds of dibutyl phthalate are dissolved in a solvent mixture consisting of 33 pounds of acetone, 10 pounds of ethyl acetate, 13 pounds of ethyl lactate and 10 pounds of toluol. If a white pigmented lacquer is desired, 24 pounds of the titanium oxide pigment known as titanox may be added and the mixture ground in a pebble mill. If a spray lacquer is desired, a volume of the solvent mixture equal to that used in making the original solution may be added.

It will be understood that the above example is merely illustrative of one method of carrying out our invention, and that we are not to be limited by it except as indicated in the appended claims. The proportions of the ingredients may be varied within wide limits, depending upon the properties desired in the finished lacquer. The total solids may be varied according to the "build" which is to be attained. The proportion of chlorinated rosin may be varied to obtain the desired hardness, adhesion and gloss. The proportion and nature of the plasticizer may be varied according to the flexibility desired. The amount of thinner may be varied to obtain the proper viscosity.

Other low-boiling solvents or solvent mixtures may be used in place of acetone and ethyl acetate. Other medium or high-boiling solvents may be used in place of ethyl lactate. Other thinners may be used in place of toluol, and other plasticizers in place of dibutyl phthalate. Other pigments, mixtures of pigments, or lakes may be used in place of titanox, or dyes may be introduced into the lacquers. Other methods may be followed in combining and/or grinding the ingredients of our lacquers.

What we claim as our invention and desire to be secured by Letters Patent of the United States is:

1. A coating composition comprising cellulose acetate and chlorinated rosin.

2. A coating composition comprising cellulose acetate, chlorinated rosin, a plasticizer, and a solvent mixture.

3. A coating composition comprising cellulose acetate, chlorinated rosin, a plasticizer, a solvent mixture, and a pigment.

4. A coating composition comprising cellulose acetate, chlorinated rosin, a plasticizer, a solvent mixture, and a mixture of pigments.

5. A coating composition comprising cellulose acetate, chlorinated rosin, a plasticizer, a solvent mixture, and coloring matter.

Signed at Rochester, N. Y., this 6th day of January, 1932.

LEON W. EBERLIN.

Signed at Stoneham, Mass., this 11th day of January, 1932.

LORING W. BLANCHARD, JR.